United States Patent
Yamanaka et al.

(10) Patent No.: US 9,686,017 B2
(45) Date of Patent: Jun. 20, 2017

(54) BIAS CONTROL CIRCUIT FOR OPTICAL MODULATOR, AND OPTICAL TRANSMITTER COMPRISING THE SAME

(71) Applicant: SUMITOMO ELECTRIC INDUSTRIES, LTD., Osaka-shi, Osaka (JP)

(72) Inventors: Shingo Yamanaka, Yokohama (JP); Eiichi Banno, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/951,827

(22) Filed: Nov. 25, 2015

(65) Prior Publication Data

US 2016/0156418 A1    Jun. 2, 2016

(30) Foreign Application Priority Data

Dec. 2, 2014  (JP) ................. 2014-244220

(51) Int. Cl.
| | |
|---|---|
| H04B 10/00 | (2013.01) |
| H04B 10/564 | (2013.01) |
| H04B 10/556 | (2013.01) |
| H04B 10/50 | (2013.01) |

(52) U.S. Cl.
CPC ..... *H04B 10/564* (2013.01); *H04B 10/50575* (2013.01); *H04B 10/5561* (2013.01)

(58) Field of Classification Search
USPC ................................. 398/192–198
See application file for complete search history.

(56) References Cited

U.S. PATENT DOCUMENTS

| | | | | | |
|---|---|---|---|---|---|
| 5,359,449 | A | * | 10/1994 | Nishimoto | G02F 1/0123 359/245 |
| 5,805,321 | A | * | 9/1998 | Ooi | G02F 1/0123 398/183 |
| 6,970,655 | B2 | * | 11/2005 | Ono | H04B 10/50572 398/186 |

(Continued)

FOREIGN PATENT DOCUMENTS

| | | |
|---|---|---|
| JP | H08-248366 A | 9/1996 |
| JP | 2008-092172 A | 4/2008 |

(Continued)

*Primary Examiner* — Agustin Bello
(74) *Attorney, Agent, or Firm* — Global IP Counselors, LLP

(57) ABSTRACT

A bias control circuit for an optical modulator including a pair of optical waveguides and a power monitor is disclosed. The bias control circuit includes a bias generator, a differential amplifier, and a controller. The bias generator provides a bias signal to one of the optical waveguides. The bias signal includes a dither signal having a predetermined frequency. The differential amplifier receives a monitor signal from the power monitor and a reference signal, and generates an amplified signal corresponding to a difference between the monitor signal and the reference signal. The controller detects frequency components contained in the amplified signal. The frequency components originates from the dither signal. The controller generates a control signal according to intensity of the frequency components. The bias signal is adjusted according to the control signal provided from the controller.

5 Claims, 8 Drawing Sheets

(56) References Cited

U.S. PATENT DOCUMENTS

| | | | | |
|---|---|---|---|---|
| 7,266,306 | B1* | 9/2007 | Harley | H04B 10/505 398/182 |
| 7,733,193 | B2* | 6/2010 | Kershteyn | H04L 27/2075 332/103 |
| 7,986,885 | B2* | 7/2011 | Mamyshev | G02F 1/0123 398/140 |
| 8,145,069 | B2* | 3/2012 | Tanaka | H04B 10/505 398/182 |
| 8,400,702 | B2* | 3/2013 | Tanaka | G02F 1/2255 359/239 |
| 8,457,503 | B2* | 6/2013 | Akiyama | G02F 1/2255 398/188 |
| 8,606,114 | B2* | 12/2013 | Holroyd | H04B 10/5051 359/279 |
| 9,020,361 | B2* | 4/2015 | Kawakami | G02F 1/0123 398/188 |
| 9,344,194 | B2* | 5/2016 | Kim | H04B 10/5053 |
| 9,419,720 | B2* | 8/2016 | Akiyama | G02F 1/0123 |
| 2001/0007508 | A1* | 7/2001 | Ooi | G02F 1/0123 359/245 |
| 2002/0005975 | A1* | 1/2002 | Nakamoto | G02F 1/0121 359/254 |
| 2003/0175037 | A1* | 9/2003 | Kimmitt | G02F 1/0123 398/198 |
| 2003/0185575 | A1* | 10/2003 | Ikeuchi | G02F 1/0123 398/197 |
| 2003/0210914 | A1* | 11/2003 | Khayim | H04B 10/50575 398/197 |
| 2004/0028418 | A1* | 2/2004 | Kaplan | G02F 1/225 398/188 |
| 2004/0161249 | A1* | 8/2004 | Suda | H04B 10/503 398/198 |
| 2005/0068600 | A1* | 3/2005 | Ogura | G02F 1/0123 359/238 |
| 2005/0117191 | A1* | 6/2005 | Griffin | G02F 1/0123 359/245 |
| 2006/0088322 | A1* | 4/2006 | Kobayashi | H04B 10/505 398/198 |
| 2006/0127102 | A1* | 6/2006 | Roberts | H04B 10/505 398/182 |
| 2006/0263098 | A1* | 11/2006 | Akiyama | G02F 1/0123 398/188 |
| 2008/0080872 | A1* | 4/2008 | Tanaka | H04B 10/505 398/186 |
| 2016/0028475 | A1* | 1/2016 | Zhang | H04B 10/0775 398/16 |
| 2016/0156418 | A1* | 6/2016 | Yamanaka | H04B 10/564 398/38 |

FOREIGN PATENT DOCUMENTS

| | | |
|---|---|---|
| JP | 2008-187223 A | 8/2008 |
| JP | 2012-257164 A | 12/2012 |
| JP | 2013-026758 A | 2/2013 |

* cited by examiner

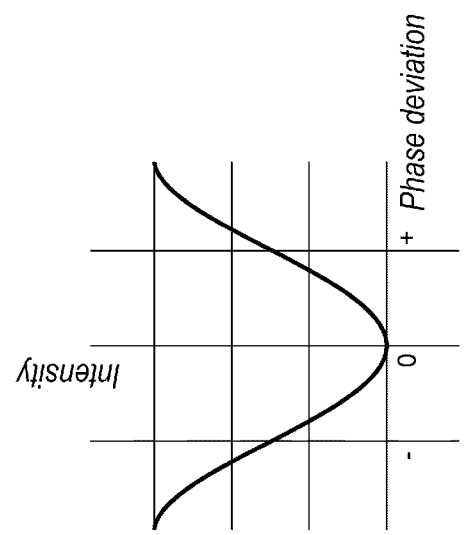
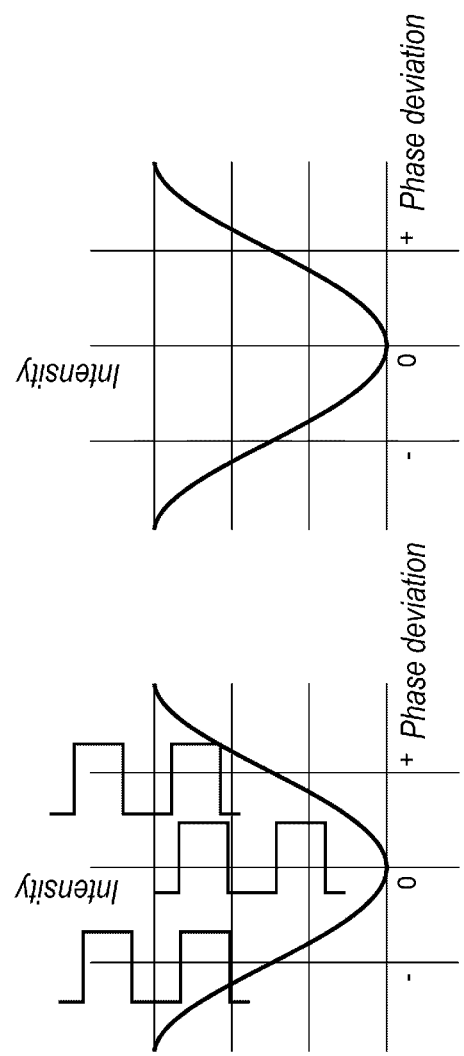

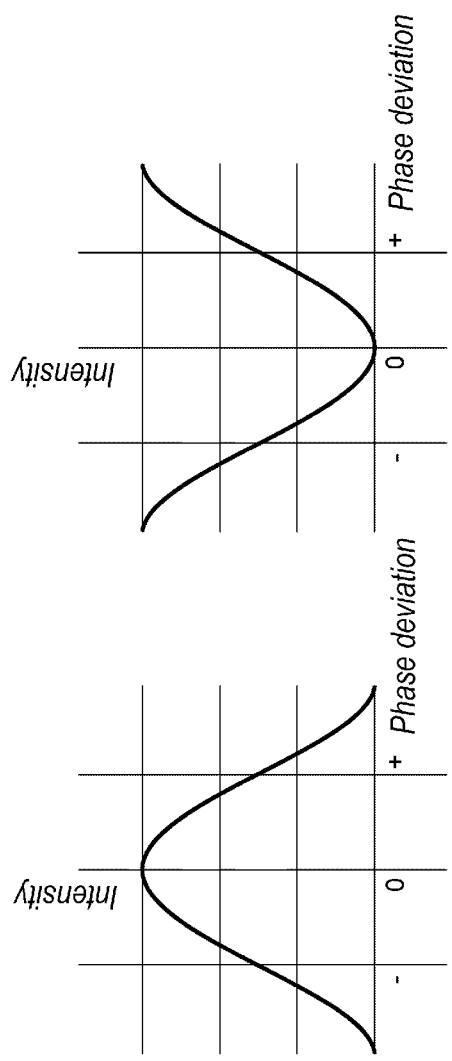

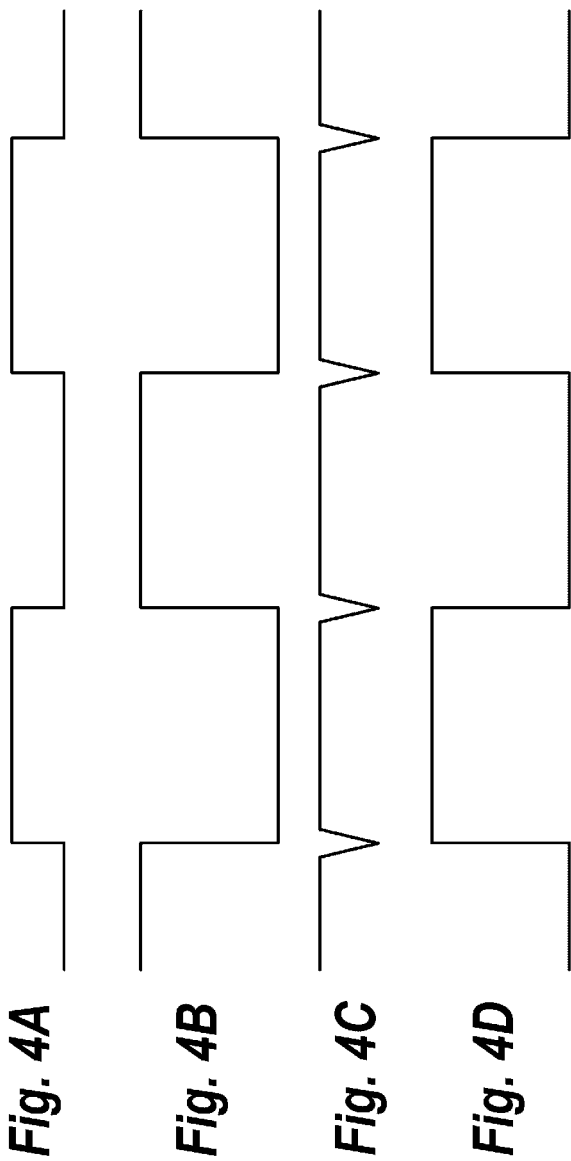

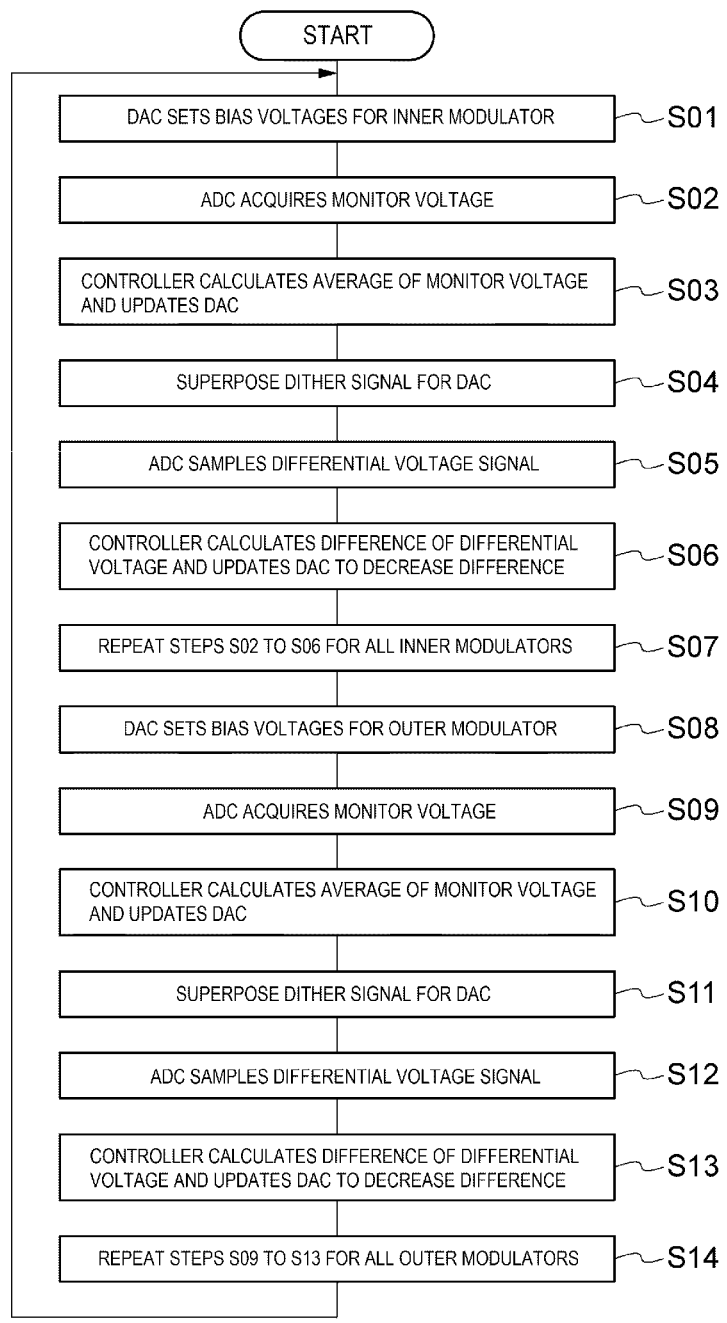

BIAS CONTROL CIRCUIT FOR OPTICAL MODULATOR, AND OPTICAL TRANSMITTER COMPRISING THE SAME

CROSS-REFERENCE TO RELATED APPLICATIONS

This application claims priority under 35 U.S.C. §119(a) to Japanese Patent Application No. 2014-244220, filed in Japan on Dec. 2, 2014, the entire contents of which are hereby incorporated herein by reference in their entirety.

BACKGROUND OF THE INVENTION

1. Field of the Invention

The present invention relates to a bias control circuit, in particular, a bias control circuit for an optical modulator used in an optical transmitter.

2. Background Arts

Technology of digital coherent optical transmission has been developed as the solution for long-distance transmission systems with a large-capacity to overcome recent rapid increase of traffic in communication networks. The technology uses Dual Polarization Quadrature Phase Shift Keying (DP-QPSK), Quadrature Amplitude Modulation (QAM), and the like as modulation and demodulation system. The DP-QPSK system uses two optical beams each having a polarization plane perpendicular to other for multiplexing, and modulates respective optical beams by Quadrature Phase Shift Keying (QPSK).

An optical transmitter for digital coherent optical transmission includes a light source (LD), a multi-level phase modulator, a driver, a bias control circuit, and so on. The light source provides Continuous Wave (CW) light as carrier. The multi-level phase modulator modulates the CW light in response to driving signals. The multi-level phase modulator is, for example, a QPSK modulator for QPSK modulation. The driver provides the driving signals. The bias control circuit provides bias voltages as reference potentials for the driving signals, and maintains the bias voltages in respective optimum values thereof (for example, refer to Patent Literature 1). The modulated signal output from the multi-level phase modulator is transmitted as an optical output signal to the outside through an optical waveguide path.

To drive the multi-level phase modulator under the optimum conditions is essential for modulating an optical signal (CW light) by the multi-level phase modulator. It is known that the multi-level phase modulator inherently shows some very slow changes (drifting phenomenon) of optical power of a modulated signal output from the multi-level phase modulator after the multi-level phase modulator begins modulation, even when the driving signals are maintained in the initial values thereof. Accordingly, the multi-level phase modulators need an Automatic Bias Control (ABC) which detects the drifting phenomenon of optical power and automatically adjusts the bias voltages to respective optimum values thereof to cancel out influence of the drifting phenomenon (refer Patent Literature 1 to 5). For example, Patent Literature 1 and 4 describe ABC circuits for intensity modulation systems, and Patent Literature 2, 3, and 5 describe ABC circuits for Differential Quadrature Phase Shift Keying (DQPSK) systems.

Patent Literature 1: Japanese Patent Application Laid-Open No. H8-248366.

Patent Literature 2: Japanese Patent Application Laid-Open No. 2008-187223.

Patent Literature 3: Japanese Patent Application Laid-Open No. 2008-92172.

Patent Literature 4: Japanese Patent Application Laid-Open No. 2012-257164.

Patent Literature 5: Japanese Patent Application Laid-Open No. 2013-26758.

In the market of optical transmission systems which constitute core networks and interconnections between servers in data centers, there have been consecutive demands for downsizing and power saving so as to realize higher capacity by higher density of communication channels. The downsizing and power saving of optical transmitters also have been required to enhance the high density of communication channels. For example, in the CFP MSA (100 G Form-factor pluggable Multi-source Agreement) for 100 Gbps optical transceivers, formulation of the second generation standards CFP2 targeting half size of CFP and the third generation standards CFP4 targeting quarter size of CFP have been promoted.

In prior arts of ABC, several analog parts like oscillator, amplifier, mixer, and filter are used to constitute a control circuit that generates a dither signal and performs synchronous detection of the dither signal from a monitor signal. Such analog parts, however, are not suitable for compaction of the control circuit, because size and power consumption thereof are difficult to be reduced. Therefore, a compact ABC circuit operable in low power consumption may contribute downsizing and power saving of optical transmitters.

SUMMARY OF THE INVENTION

An aspect of the present application relates to a bias control circuit for an optical modulator including a pair of optical waveguides and a power monitor. The bias control circuit includes a bias generator, a differential amplifier, and a controller. The bias generator provides a bias signal to one of the optical waveguides. The bias signal includes a dither signal having a predetermined frequency. The differential amplifier receives a monitor signal from the power monitor and a reference signal, and generates an amplified signal corresponding to a difference between the monitor signal and the reference signal. The controller detects frequency components contained in the amplified signal. The frequency components originates from the dither signal. The controller generates a control signal according to intensity of the frequency components. The bias signal is adjusted according to the control signal provided from the controller.

Another aspect of the present application relates to an optical transmitter. The optical transmitter includes a multi-level phase modulator and a bias control circuit for the multi-level phase modulator. The multi-level phase modulator includes an outer modulator and a power monitor. The outer modulator includes a pair of optical waveguides. Each of the optical waveguides provides inner modulators. Each of inner modulators includes a pair of waveguides. The power monitor receives an optical signal output from the multi-level phase modulator and generates a current signal according to intensity of the optical signal. The bias control circuit includes a bias generator, a resistor, a differential amplifier, and a controller. The bias generator provides bias signals to the respective waveguides of one of the inner modulators. The bias generator adjusts the respective bias signals. Each of the first bias signals includes dither signals superposed thereon. The dither signals have respective predetermined frequencies. The resistor is connected in series with the power monitor. The resistor converts a current signal output from the power monitor to a monitor signal.

The differential amplifier receives the monitor signal and a reference signal. The differential amplifier generates an amplified signal corresponding to a difference between the monitor signal and the reference signal. The controller detects frequency components contained in the amplified signal and originating from the dither signals. The controller generates a control signal according to intensity of the frequency components. The control signal adjusts the bias signals.

BRIEF DESCRIPTION OF THE DRAWINGS

The foregoing and other purposes, aspects and advantages will be better understood from the following detailed description of a preferred embodiment of the invention with reference to the drawings, in which:

FIG. 2A is a graph showing relationship between phase deviation in an inner modulator and intensity of a monitor signal for the inner modulator under the condition that a differential voltage signal for driving the inner modulator has amplitude less than 1.2 π;

FIG. 2B is a graph showing relationship between phase deviation in an outer modulator and intensity of a monitor signal for the outer modulator on the same condition as FIG. 2A;

FIG. 3A is a graph showing relationship between phase deviation in an inner modulator and intensity of a monitor signal for the inner modulator under the condition that the differential voltage signal for driving the inner modulator has amplitude more than 1.2 π;

FIG. 3B is a graph showing relationship between phase deviation in an outer modulator and intensity of a monitor signal for the outer modulator on the same condition as FIG. 3A;

FIGS. 4A to 4D show waveforms of a dither signal superposed to bias voltages applied to an inner modulator shown FIG. 1, intensity of a monitor signal when phase deviation in the inner modulator shifts to the negative direction, intensity of the monitor signal when the phase deviation is zero, and intensity of the monitor signal when the phase deviation shifts to a positive direction, respectively.

FIG. 5 is a flow chart for procedures of bias voltage control implemented by the bias control circuit 200 shown in FIG. 1.

DESCRIPTION OF THE PREFERRED EMBODIMENTS

Figure 1:
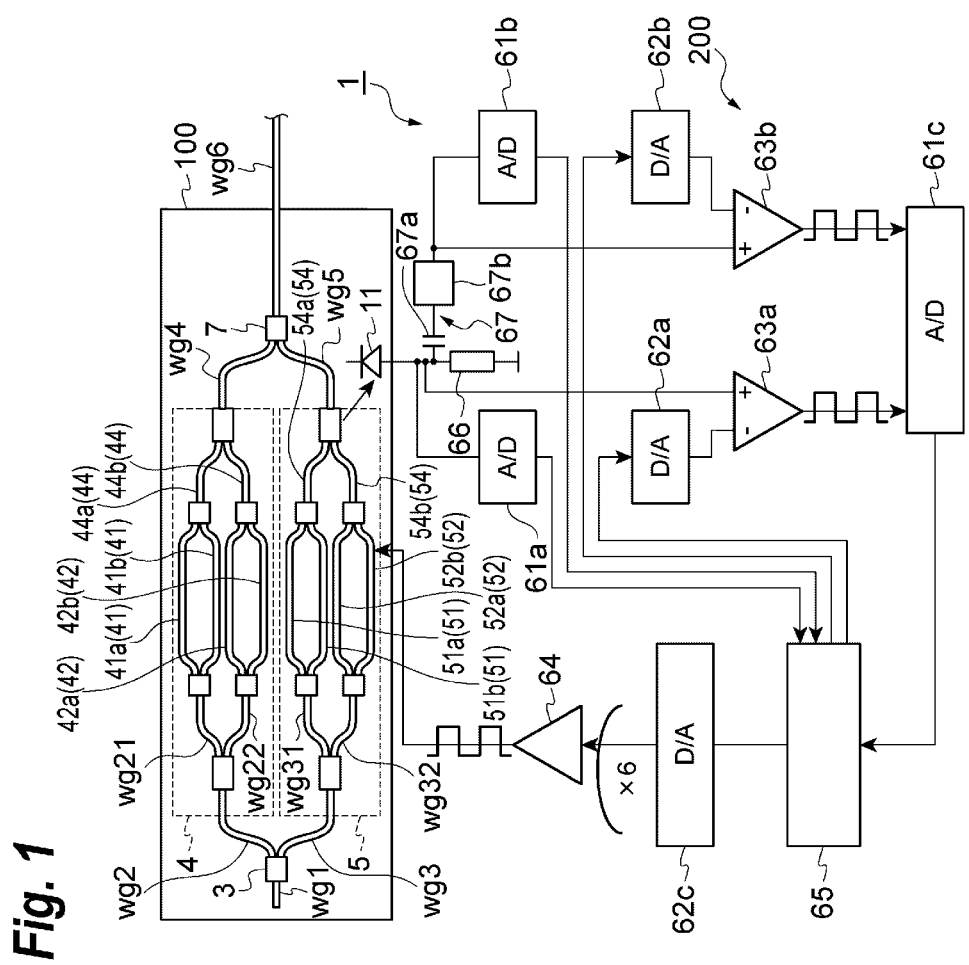
FIG. 1 is a schematic diagram of an optical transmitter according to a first embodiment of the present invention.

FIG. 1 is a schematic diagram of an optical transmitter 1 according to a first embodiment of the present invention. The optical transmitter 1 includes a DP-QPSK modulator (dual multi-level phase modulator for polarization multiplexing) 100 and a bias control circuit 200. The DP-QPSK modulator 100 generates a modulated optical signal having an X-polarization plane (hereafter, X modulated signal) and another modulated optical signal having a Y-polarization plane perpendicular to the X-polarization plane (hereafter, Y modulated signal), and outputs an optical output signal (polarization-multiplexed optical signal) multiplexed from the X and Y modulated signals. The bias control circuit 200 provides bias voltages to the DP-QPSK modulator 100 and adjusts the bias voltages to respective optimum values thereof. Additionally, the optical transmitter 1 may include a light source (LD) to provide CW light, a modulator driver to generate driving signals to drive the DP-QPSK modulator 100, which are not drawn in FIG. 1.

The DP-QPSK modulator 100 includes an optical splitter 3, a first QPSK modulator (first multi-level phase modulator) 4, a second QPSK modulator (second multi-level phase modulator) 5, an optical coupler 7, and a first power monitor (photo detector) 11. The DP-QPSK modulator 100 transmits the polarization-multiplexed optical signal to the outside through an optical waveguide wg6. The polarization-multiplexed optical signal is generated (multiplexed) from the X modulated signal and the Y modulated signal by polarization multiplexing.

In the DP-QPSK modulator 100, an optical beam emitted from a light source like laser diode (not drawn in FIG. 1) enters the optical splitter 3 through an optical waveguide wg1. The optical beam has a predetermined frequency and single polarization plane. The optical splitter 3 is put in downstream of the optical waveguide wg1 and in upstream of the first QPSK modulator 4 and the second QPSK modulator 5. The optical splitter 3 splits the optical beam into two sub optical beams, X light and Y light. The X light and Y light have substantially equal intensity each other. The optical splitter 3 outputs the X light to the first QPSK modulator (first multi-level phase modulator) 4 through an optical waveguide wg2, and outputs the Y light to the second QPSK modulator (second multi-level phase modulator) 5 through an optical waveguide wg3. The X light and Y light have the same polarization plane as the optical beam before entering the optical splitter 3. Therefore, The X light has a polarization plane identical with the polarization plane that the Y light has.

The first QPSK modulator 4 generates the X modulated signal by applying QPSK modulation to the X light. The first QPSK modulator 4 outputs the X modulated signal to the optical coupler 7 through an optical waveguide wg4. The second QPSK modulator 5 generates the Y modulated signal by applying QPSK modulation to the Y light. The second QPSK modulator 5 outputs the Y modulated signal to the optical coupler 7 through an optical waveguide wg5.

The optical coupler 7 multiplexes the X modulated signal and the Y modulated signal to generate the polarization-multiplexed optical signal. The polarization plane of the X modulated signal is rotated by 90 degrees by a polarization rotator (not drawn in FIG. 1) put in the optical waveguide wg4, before the X modulated signal enters the optical coupler 7. The optical coupler 7 outputs the polarization-multiplexed optical signal to the outside through the optical waveguide wg6. Here, the polarization plane of the Y modulated signal, instead of the polarization plane of the X modulated signal, may be rotated by 90 degrees by an alternative polarization rotator put in the optical waveguide wg5, instead of the optical waveguide wg4.

More specifically, the first QPSK modulator 4 includes an outer modulator 44 and two inner modulators 41, 42 that are nested in the outer modulator 44. The inner modulator 41 includes a pair of optical waveguides 41a, 41b constituting a Mach-Zehnder-type modulator (MZ modulator). The inner modulator 42 includes another pair of optical waveguides 42a, 42b constituting another MZ modulator. At an input end of the first QPSK modulator 4, the optical waveguide wg2 branches to two optical waveguides wg21, wg22. The inner modulator 41 is formed in downstream of the optical waveguide wg21 and the inner modulator 42 is formed in downstream of the optical waveguide wg22. An input end of the inner modulator 41 is connected with the optical waveguide wg21. An output end of the inner modulator 41 is connected with an optical waveguide 44a. An input end of the inner modulator 42 is connected with the optical waveguide wg22. An output end of the inner modulator 42 is connected with an optical waveguide 44a. The optical waveguides 44a, 44b are combined into the optical waveguide wg4 at the output end of the first QPSK modulator 4.

In the first QPSK modulator described above, one of the two optical beams divided from the X light is phase-modulated by a data signal DXI, when passing through the optical waveguides 41a, 41b, and is output as an XI modulated signal. The optical waveguides 41a, 41b provide respective electrodes thereon (not drawn in FIG. 1). A differential voltage signal generated from driving signals based on the data signal DXI and the bias voltages are applied to the respective electrodes of the optical waveguides 41a, 41b. For example, when a differential voltage signal VXI includes a positive-phase voltage signal VXIP and a negative-phase voltage signal VXIN and satisfies a formula VXI=VXIP−VXIN, the positive-phase voltage signal VXIP and a bias voltage therefor are applied to the electrode of the optical waveguide 41a and the negative-phase voltage signal VXIN and a bias voltage therefor are applied to the electrode of the optical waveguide 41b.

The positive-phase voltage signal VXIP and the negative-phase voltage signal VXIN are superposed to respective bias voltages. The bias voltages determine two phase states that the XI modulated signal alternatively has. Therefore, the bias voltages for the positive-phase voltage signal VXIP and the negative-phase voltage signal VXIN are controlled to be maintained in respective optimum values thereof.

On the other hand, the other of the two optical beams divided from the X light is phase-modulated by another data signal DXQ when passing through the optical waveguides 42a, 42b, and is output as an XQ modulated signal. The optical waveguides 42a, 42b provide respective electrodes thereon (not drawn in FIG. 1). Another differential voltage signal generated from driving signals based on the data signal DXQ and the bias voltages are applied to the respective electrodes of the optical waveguides 42a, 42b.

The bias voltages determine two phase states that the XQ modulated signal alternatively has. Therefore, the bias voltages for the positive-phase voltage signal VXIP and the negative-phase voltage signal VXIN are controlled to be maintained in respective optimum values thereof. When the XI modulated signal output from the inner modulator 41 passes through the optical waveguide 44a, phase of the XI modulated signal is adjusted by a bias voltages applied to the electrode (not shown in FIG. 1) put on the optical waveguide 44a. Also, When the XQ modulated signal output from the inner modulator 42 passes through the optical waveguide 44b, phase of the XQ modulated signal is adjusted by a bias voltage applied to the electrode (not shown in FIG. 1) put on the optical waveguide 44b.

The fore-mentioned two phase adjustments for the first QPSK modulator 4 are performed so that phase of the XI modulated signal is shifted by 90 degrees from phase of the XQ modulated signal. Then, the XI modulated signal that passes through the optical waveguide 44a and the XQ modulated signal that passes through the optical waveguide 44b are multiplexed to output the X modulated signal to the optical coupler 7 through the optical waveguide wg4.

The second QPSK modulator 5 includes an outer modulator 54 and two inner modulators 51, 52 that are nested in the outer modulator 54. The inner modulator 51 includes a pair of optical waveguide 51a, 51b constituting an MZ modulator. The inner modulator 52 includes another pair of optical waveguide 52a, 52b constituting another MZ modulator. At the input end of the second QPSK modulator 5, the optical waveguide wg3 branches to two optical waveguides wg31, wg32. The optical waveguide wg31 further branches two optical waveguides 51a, 51b and also the optical waveguide wg32 branches two optical waveguides 52a, 52b. The optical waveguides 51a, 51b are combined at the output ends thereof to the optical waveguide 54a. The optical waveguides 52a, 52b are combined at the output ends thereof to the optical waveguide 54b.

An output end of the outer modulator 54 is connected with the optical waveguide 54a. In addition, the second QPSK modulator 5 includes the first power monitor (photo detector) 11 to monitor intensity of the Y modulated signal that is phase-modulated through the inner modulators 51, 52 and the outer modulator 54. More specifically, the first power monitor 11 is put in the vicinity of the output end of the outer modulator 54 so that the first power monitor receives a portion of an optical signal output from the second QPSK modulator and generates a current signal according to intensity of the portion of the optical signal.

In the second QPSK modulator described above, one of the two optical beams divided from the Y light is phase-modulated by a data signal DYI when passing through the optical waveguides 51a, 51b, and is output as a YI modulated signal. The optical waveguides 51a, 51b provide respective electrodes thereon (not drawn in FIG. 1). A differential voltage signal generated from the data signal DYI and bias voltages are applied to the respective electrodes of the optical waveguides 51a, 51b. For example, when a differential voltage signal VYI includes a positive-phase voltage signal VYIP and a negative-phase voltage signal VYIN and satisfies a formula VYI=VYIP−VYIN, the positive-phase voltage signal VYIP is applied to the electrode of the optical waveguide 51a and the negative-phase voltage signal VYIN is applied to the electrode of the optical waveguide 52b.

The positive-phase voltage signal VYIP and the negative-phase voltage signal VYIN are superposed to respective bias voltages thereof. The bias voltages determine two phase states that the YI modulated signal alternatively has. Therefore, the bias voltages for the positive-phase voltage signal VYIP and the negative-phase voltage signal VYIN are controlled to be maintained in respective optimum values thereof.

On the other hand, the other of the two optical beams divided from the Y light is phase-modulated by a data signal DYQ when passing through the optical waveguides 52a, 52b, and is output as a YQ modulated signal. The optical waveguides 52a, 52b provide respective electrodes thereon (not drawn in FIG. 1). A differential voltage signal generated from the data signal DYQ and bias voltages therefor are applied to the respective electrodes of the optical waveguides 52a, 52b.

The bias voltages determine two phase states that the YQ modulated signal alternatively has. Therefore, the bias voltages for the positive-phase voltage signal VYIP and the negative-phase voltage signal VYIN are controlled to be maintained in respective optimum values thereof. When the YI modulated signal output from the inner modulator 51 passes through the optical waveguide 54a, phase of the YI modulated signal is adjusted by a bias voltage applied to the electrode (not shown in FIG. 1) put on the optical waveguide 54a. Also, When the YQ modulated signal output from the inner modulator 52 passes through the optical waveguide 54b, phase of the YQ modulated signal is adjusted by another bias voltage applied to the electrode (not shown in FIG. 1) put on the optical waveguide 54b.

The fore-mentioned two phase adjustments for the second QPSK modulator 5 are performed so that the phase of the YI modulated signal is shifted by 90 degrees from the phase of the YQ modulated signal. The YI modulated signal that passed through the optical waveguide 54a and the YQ modulated signal that passed through the optical waveguide 54b are multiplexed to output the Y modulated signal to the optical coupler 7 through the wg5.

In the following, configuration of the bias control circuit 200 in the optical transmitter 1 is described in detail.

The bias control circuit 200 provides bias voltages to the second QPSK modulator 5 in the DP-QPSK modulator 100, and controls the bias voltages for generating the Y modulated signal. The bias control circuit 200 includes ADCs (Analog-to-Digital Converters) 61a, 61b, 61c, DACs (Digital-to-Analog Converters) 62a, 62b, 62c, differential amplifiers 63a, 63b, an amplifier 64, a controller (control circuit) 65, a resistor 66, and a filter 67. The configuration of the bias control circuit 200 may be used also for the first QPSK modulator 4. Accordingly, the bias control circuit 100 may be modified to constitute an expanded bias control circuit both for the X and Y modulated signals.

The resistor 66 is connected with the first power monitor (photo detector) 11 in series. The resistor 66 converts the current signal output from the first power monitor 11 to a voltage signal (first monitor signal) Vmon1, which corresponds to intensity of the Y modulated signal. ADC (first ADC) 61a has an analog input terminal connected with both one end (an anode) of the first power monitor 11 and one end of the resistor 66 to receive the monitor signal Vmon1. The other end of the resistor 66 is grounded. ADC 61a converts the first monitor signal Vmon1 to a digital signal (first digital signal) Dmon1 and outputs the digital signal Dmon1 to the controller 65. The controller 65 calculates a digital signal Davg1 that corresponds to an average value Dmon1a of the digital signal Dmon1. DAC (first DAC) 62a receives the digital signal Davg1 from the controller 65 and generates a reference signal (first reference signal) Vavg1a that corresponds to an average value of the first monitor signal Vmon1 by Digital-to-Analog conversion (D/A conversion).

The differential amplifier (first differential amplifier) 63a has a non-inverting input terminal and an inverting input terminal. The non-inverting input terminal is connected with both the one end (the anode) of the first power monitor 11 and the one end of the resistor 66 so as to receive the first monitor signal Vmon1. The other end of the resistor 66 is grounded. The inverting input terminal is connected with an output terminal of DAC 62a. The differential amplifier 63a amplifies a difference between the first monitor signal Vmon1 and the reference signal Vavg1a, namely Vmon1−Vavg1a, and outputs an amplified signal as a differential amplified signal (first amplified signal) Vdi1a, whose amplitude depends on the difference Vmon1−Vavg1a.

ADC 61b has an analog input terminal coupled with both the one end (the anode) of the first power monitor and the one end of the resistor 66 through a filter 67 by AC-coupling. The filter 67 is a series circuit constituted of a capacitor 67a and a log amplifier 67b. The filter 67 cuts low frequency components less than a cutoff frequency from the first monitor signal Vmon1 by the capacitor 67a. The log amplifier 67b amplifies the first monitor signal Vmon1 that passed through the capacitor 67a. The log amplifier 67b outputs the amplified first monitor signal as a second monitor signal Vmon2. The series circuit provides a wide dynamic range and high sensitivities suitable for signal detection. The cutoff frequency depends on capacitance of the capacitor 67a and input impedance of the log amplifier 67b. ADC 61b converts a signal output from the filter 67 to a digital signal (second digital signal) Dmon1b and outputs the digital signal Dmon1b to the controller 65.

DAC 62b receives a digital signal Davg1b that corresponds to an average value of the digital signal Dmon1b calculated by the controller 65. DAC 62a converts the digital signal Davg1b to another reference signal (second reference signal) Vavg1b that corresponds to an average value of the second monitor signal Vmon2 by Digital-to-Analog conversion (D/A conversion).

The differential amplifier (second differential amplifier) 63b has a non-inverting input terminal and an inverting input terminal. The non-inverting input terminal thereof is connected with an output terminal of the filter 67 to receive that the second monitor signal Vmon2 whose low frequency components (DC components) have been cut from the first monitor signal Vmon1 by the filter 67. The inverting input terminal thereof is connected with an output terminal of DAC 62b to receive the reference voltage signal (second reference signal) Vavg1b. The differential amplifier 63b amplifies a difference between the second monitor signal Vmon2 whose low frequency components were cut by the filter 67 from the first monitor signal Vmon1 and the reference signal Vavg1b and outputs an amplified signal as a differential amplified signal (second amplified signal) Vdi1b, whose amplitude depends on the difference Vmon2−Vavg1b.

ADC 61c has two analog input terminals that are connected with the output terminals of the differential amplifiers 63a, 63b, respectively. ADC 61c (second ADC) converts the differential amplified signal (first amplified signal) Vdi1a to a digital signal Ddi1a and also converts the differential amplified signal Vdi1b to a digital signal Ddi1b. ADC 61c outputs the digital signals Ddi1a, Ddi1b to the controller 65.

The controller 65 is a digital processing circuit including a CPU (Central Processing Unit) core, a built-in memory, and so on. The controller 65 performs digital data processing based on digital signals received from the ADC 61a, 61b, and 61c. More specifically, the controller 65 calculates a digital average value Davg1a from the digital signal Dmon1a and transmits the digital average value Davg1a to DAC 62a. Also, the controller 65 calculates a digital average value Davg1b from the digital signal Dmon1b and transmits the digital average value Davg1a to DAC 62b.

Further, the controller 65 detects frequency components (first frequency components) Dext1a from the digital signal Ddi1a output by ADC 61c. The frequency components Dext1a originates from a dither signal (first dither signal) superposed to bias signals (first bias signals) of an inner modulator selected to be controlled (hereafter, target inner modulator). Then, the controller 65 adjusts voltages of the bias signals (first bias signals) applied to the target inner modulator according to magnitude of the frequency components Dext1a. At the same time, the controller 65 generates a digital signal Dbi1a by digital data processing to superpose the dither signal having a predetermined frequency to the bias signals of the target inner modulator. The controller 65 send the digital signal Dbi1a to DAC (second DAC) 62c.

In the same way, the controller 65 detects other frequency components (second frequency components) Dext1*b* from the digital signal Ddi1*b* output by ADC 61*c*. The frequency components Dext1*b* corresponds to a dither signal (second dither signal) superposed to bias signals (second bias signals) of an outer modulator to be controlled (hereafter, target outer modulator). Then, the controller 65 adjusts voltages of the bias signals (second bias voltages) applied to the target outer modulator according to magnitude of the frequency components Dext1*b*. At the same time, the controller 65 generates a digital signal Dbi1*b* by digital data processing to superpose the dither signal having a predetermined frequency to the bias voltages of the target outer modulator. The controller 65 send the digital signal Dbi1*b* to DAC 62*c*.

DAC 62*c* (bias generator) is a Digital-to-Analog converter including 6 channels that are connected with respective electrodes of the inner modulators 51, 52, and the outer modulator 54 through an amplifier 64 on one to one basis. DAC 62*c* generates a bias signal (first bias signal) Vbi1*a* to be applied to an electrode of a target inner modulator from the digital signal Dbia1*a* by D/A conversion. Specifically, DAC 62*c* sets the bias signal Vbi1*a* in response to the digital signal Dbia1*a* and superposes a dither signal to the bias signal Vbi1*a*. Then, DAC 62*c* applies the bias signal Vbia1*a* to a target inner modulator selected from the inner modulator 51, 52, through the amplifier 64. The amplifier 64 provides four amplifiers for the two inner modulators. The four amplifiers are put between respective four channels of DAC 62*c* and respective four electrodes of the inner modulators 51, 52 on one to one basis.

DAC 62*c* generates a bias signal (second bias signals) Vbi1*b* to be applied to an electrode of a target outer modulator from the digital signal Dbia1*b* by D/A conversion. Specifically, DAC 62*c* sets the bias voltage Vbi1*b* according to the digital signal Dbia1*b* and superposes a dither signal to the bias signal Vbi1*b*. Then, DAC 62*c* applies the bias signal Vbia1*b* to one of two electrode of the outer modulator through the amplifier 64. The amplifier 64 provides two amplifiers for the outer modulator 54. The two amplifiers are put between respective two channels of DAC 62*c* and respective two electrodes of the outer modulator 54 on one to one basis. Accordingly, the amplifier 64 provide a total of six amplifiers for the QPSK modulator (multi-level phase modulator) 5 so as to provide respective bias signals and respective dither signals to be superposed to the respective bias signals.

Referring FIGS. 2A to 3B, principle of bias voltage control method implemented by the bias control circuit 200 is described. FIG. 2A is a graph showing relationship between phase deviation in an inner modulator and intensity of a monitor signal for the inner modulator under the condition that a differential voltage signal for driving the inner modulator has amplitude less than 1.2 π. Here, the voltage π is defined as a voltage to set a phase difference occurring in an MZ modulator to n. FIG. 2B is a graph showing relationship between phase deviation in an outer modulator and intensity of a monitor signal for the outer modulator on the same condition as FIG. 2A. Three waveforms in FIG. 2A are drawn to illustrate the phase deviation. The waveform in the center shows the case that phase deviation is zero, namely this is a standard for other two waveforms. The waveform in the right-hand side has a positive phase deviation in comparison with the waveform in the center. The waveform in the left-hand side has a negative phase deviation in comparison with the waveform in the center. Time for the waveforms goes to a positive direction along the Y axis. FIG. 3A is a graph showing relationship between phase deviation in an inner modulator and intensity of a monitor signal for the inner modulator under the condition that the differential voltage signal for driving the inner modulator has amplitude more than 1.2 π. FIG. 3B is a graph showing relationship between phase deviation in an outer modulator and intensity of a monitor signal for the outer modulator on the same condition as FIG. 3A.

For a pair of optical waveguides of an MZ modulator, phase difference between a beam passed through one of the optical waveguides and another beam passed through the other of the optical waveguides is set to an optimum value by adjusting voltages of bias signals applied to respective electrodes of the optical waveguides thereon. The phase deviation above means deviation of the phase from the optimum value owing to a drifting phenomenon occurred in the MZ modulator. Therefore, by adjusting bias voltages so that intensity of monitor signal approaches the value when the phase deviation is zero in the relationship between the phase deviation and the intensity of monitor signal, the bias control circuit 200 may compensate influence of the drifting phenomenon on the bias voltages and maintain the phase difference between the two beams passing through respective optical waveguides in an optimum value (namely, phase deviation from the optimum value stays in zero). The differential voltage signal mentioned above, for example, is expressed by a formula Vxi=Vxip−Vxin, where Vxi is voltage of differential voltage signal, Vxip is voltage of a positive-phase driving signal applied to an electrode of one of the optical waveguides, and Vxin is a voltage of a negative-phase driving signal applied to an electrode of the other of the optical waveguides. The positive-phase driving signal Vxip and the negative-phase voltage signal Vxin are provided by a modulator driver (not drawn in FIG. 1) as a pair of complementary signals each of which has a phase opposite from other.

As shown FIG. 2A, for an inner modulator driven by the differential voltage signal Vxi having amplitude less than 1.2 π, intensity of monitor signal for the inner modulator has a bottom (minimum) when phase deviation is zero and increases when absolute value of phase deviation increases, as the graph shows symmetry about the Y axis. As shown FIG. 2B, under the condition that inner modulators driven by the differential voltage signal Vxi having amplitude less than 1.2 π, intensity of monitor signal for the outer modulator in which the inner modulators are nested has a bottom (minimum) when phase deviation is zero and increases when absolute value of phase deviation increases, as the graph shows symmetry about the Y axis. Accordingly, respective voltages of bias signals for the inner modulators and the outer modulator become respective optimum values thereof when intensity of the respective monitor signals has a minimum value (bottom), as for the case of FIGS. 2A and 2B.

As shown FIG. 3A, for an inner modulator driven by the differential voltage signal Vxi having amplitude more than 1.2 π, intensity of monitor signal for the inner modulator has a peak (maximum) when phase deviation is zero and increases when absolute value of phase deviation decreases, as the graph shows symmetry about the Y axis. As shown FIG. 3B, under the condition that inner modulators driven by the differential voltage signal Vxi having amplitude more than 1.2 π, intensity of monitor signal for the outer modulator in which the inner modulators are nested has a bottom (minimum) when phase deviation is zero and increases when absolute value of phase deviation increases, as the graph shows symmetry about the Y axis. Accordingly, respective voltages of bias signals for the inner modulators and the outer modulator become respective optimum values thereof, when intensity of the respective monitor signals for the inner modulators have a maximum value (peak) and intensity of the respective monitor signals for the outer modulator have a minimum value (bottom), as for the case of FIGS. 3A and 3B.

Based on the characteristics described above, the bias control circuit 200 controls voltages of bias signals that are applied to the second QPSK modulator 5 of the DP-QPSK modulator 100, for maintaining the voltages of the bias signals in respective optimum values thereof. FIGS. 4A to 4D are waveforms of signals related to an inner modulator, when the differential voltage signal for driving the inner modulator has amplitude less than 1.2 π. FIG. 4A is a waveform of a dither signal superposed to bias signals applied to an inner modulator having two electrodes. FIG. 4B is a waveform of intensity of monitor signal when phase deviation in the inner modulator drifts (shifts) toward a negative direction. FIG. 4C is a waveform of intensity of the monitor signal when phase deviation in the inner modulator stays in zero (namely, the phase is maintained in the optimum value thereof). FIG. 4D is a waveform of intensity of the monitor signal when phase deviation in the inner modulator drifts toward a positive direction. The controller 65 adjusts the voltages of the bias signals applied to the inner modulator so that intensity of monitor signal approaches the minimum value, for compensating the phase deviation.

For example, in comparison of the waveform in FIG. 4B with the waveform in FIG. 4A, the positions of peaks and bottoms in FIG. 4A are inverted from those in FIG. 4B. The relationship of such inversion arises from a negative differential coefficient of the graph (for example, refer to FIG. 2A). Therefore, such inverted relationship allows the bias control circuit to detect that phase deviation occurs in a negative direction. On the other hand, in comparison of the waveform in FIG. 4D with the waveform in FIG. 4A, the positions of peaks and bottoms in FIG. 4D are in phase with those in FIG. 4A. The relationship of such correspondence in phase arises from a positive differential coefficient of the curve. The similar relationship allows the bias control circuit to detect that phase deviation occurs in a positive direction. More specifically, the controller 65 performs such comparison of waveforms by sampling the monitor signal (first monitor signal) by taking appropriate time intervals and processing the sampled data. Accordingly, the controller 65 in the bias control circuit 200 adjusts voltages of bias signals provided to an inner modulator so that intensity of the frequency components (first frequency components) Dext1$a$ corresponding to amplitude of an differential amplified signal (first amplified signal) becomes minimum value, under the condition that amplitude of a differential voltage signal for driving the inner modulator is less than 1.2 π. The controller 65 adjusts the voltages of the bias signals (second bias signals) provided to an outer modulator so that intensity of the frequency components (second frequency components) Dext1$b$ corresponding to amplitude of an differential amplified signal (second amplified signal) becomes minimum value, under the same condition.

On the other hand, under the condition that amplitude of the differential voltage signal for driving the inner modulator is more than 1.2 π, the controller 65 adjusts the voltages of the bias signals (first bias signals) provided to the inner modulator so that intensity of the frequency components (first frequency components) Dext1$a$ corresponding to amplitude of the differentially amplified signal (first amplified signal) becomes maximum value. The controller 65 adjusts the voltages of the bias signals provided to the outer modulator so that intensity of the frequency components (second frequency components) Dext1$b$ corresponding to amplitude of a differentially amplified signal (second amplified signal) becomes minimum value, under the same condition. In the description above, FIGS. 2A to 3B are used as examples for the relationship between the phase deviation and the intensity of monitor signal. Other embodiments of the present invention are possible as far as the relationship between phase deviation and intensity of monitor signal is uniquely determined as the examples above. In addition, the other embodiments are not restricted by whether the differential voltage signal has amplitude less than 1.2 π or not.

In the following, referring to FIG. 5, procedures of bias voltage control by the bias control circuit 200 is described. FIG. 5 is a flow chart of procedures of bias voltage control implemented by the bias control circuit 200 shown in FIG. 1.

When the optical transmitter 1 begins a normal operation, the controller 65 in the bias control circuit 200 sets initial values of bias voltages (first bias signals) Vbia1$a$ that DAC 62$c$ applies to respective electrodes of the inner modulators 51, 52 (Step S01). Next, ADC 61$a$ (first ADC) acquires a digital signal (first digital signal) Dmon1$a$ corresponding to a monitor signal (first monitor signal) Vmon1 regarding one of the inner modulators 51, 52 that is selected to be controlled before the other (Step S02). Then, the controller 65 calculates average of the digital signal Dmon1$a$ as a digital signal Davg1$a$ and updates the reference signal (first reference signal) Vavg1$a$ that is output from an output terminal of DAC 62$a$ (first DAC) according to the digital signal Davg1$a$ (Step 03).

Further, the controller 65 inputs a digital signal to DAC 62$c$ (second ADC) so that a dither signal (first dither signal) is superposed to the bias voltage (first bias signal) Vbia1$a$ of one of the inner modulators 51, 52 (target inner modulator) that is selected to be controlled before the other (Step 04). Then, ADC 61$c$ (second ADC) samples the differential amplified signal (first amplified signal) Vdi1$a$ that the differential amplifier 63$a$ generates according to difference between the monitor signal (first monitor signal) Vmon1 and the reference signal (first reference signal) Vavg1$a$ and, and outputs a digital signal Ddi1$a$ converted from the differential amplified signal Vdi1$a$ by D/A conversion (Step 05). Then, the controller 65 calculates a difference of sampled values for the digital signal Ddi1$a$ and generates a digital signal Dbia1$a$ for controlling the bias voltages (first bias signals) of the target inner modulator so that the difference approaches zero. The controller 65 updates setting values of DAC 62$c$ based on the digital signal Dbia1$a$ (Step 06).

Specifically, the "difference of sampled values" above means, for example, a difference ΔS=S(t2)−S(t1), where S(t) is intensity of monitor signal (first monitor signal) as a function of time shown in FIGS. 4B to 4D, t1 is an instant within an interval of a bottom (low level) of dither signal, and t2 is an instant within the following interval in which dither signal has peak (high level). Judging if ΔS is positive or negative allows the controller 65 to detect that phase deviation is positive or negative. Further, magnitude (absolute value) of ΔS corresponds to intensity of monitor signal. Therefore, ΔS can be used as a target value controlled to be in minimum value or maximum value of monitor signal (first monitor signals) thereof for the bias voltage control. The controller 65 may perform the phase detection described above by digital data processing. For example, the controller generates a third digital signal having the predetermined frequency. The third digital signal corresponds to a first dither signal in analog signal. The controller 65 detects the intensity of the frequency components (first frequency components) of the first differential amplified signal (first amplified signal) by comparing the third digital signal and a second digital signal. The second digital signal corresponds to the first amplified signal, as the DAC (second ADC) 61c converts the first amplified signal to a second digital signal. In addition, the controller superposes the third digital signal on the first control signal so that a dither signal (first dither signal) is superposed on the bias signal (first bias signal).

Thus, the bias voltages (first bias signals) applied to electrodes of a target inner modulator has been adjusted. Steps S02 to S06 are repeated for another bias voltage (first bias signals) applied to another electrode of the target inner modulator and further two bias voltages for the other inner modulator. As a result, the repetition from step 02 to step 06 is made for every two electrodes of the inner modulators 51, 52 (Step 07). A differential amplified signal Vdi1a is a voltage signal amplified by gain from a difference between a monitor signal Vmon1 and a reference signal Vavg1a, namely Vmon1−Vavg1a. The monitor signal Vmon1 includes, for example, optical monitor components to monitor intensity of the optical signal (Y modulated signal) output from the second QPSK modulator 5 and frequency components (first frequency components) originating from a dither signal (first dither signal). Because magnitude of the dither signal is typically several percent of magnitude of modulation signal (differential voltage signal), modulation signal in the monitor signal (first monitor signal) Vmon1 is greater than several times to dozens of times of magnitude of the frequency components. When an amplifier amplifies the monitor signal Vmon1, the gain is restrained because magnitude of amplified optical monitor components is limited by maximum amplitude of output voltage. Accordingly, the frequency components (first frequency components) may not be amplified sufficiently.

As the reference signal Vavg1a corresponds to the optical monitor components, only the dither components may be amplified by subtracting the optical monitor components from the monitor signal Vmon1. For example, when the optical monitor components has voltage intensity of 1V and the frequency components has magnitude of 0.05V, the gain is limited up to double if magnitude of an output voltage of an amplifier is limited to 2V. Specifically, the gain is calculated like 1.9 times=(output voltage 2V) by (input voltage 1V+0.05V). Accordingly, the frequency components are amplified to 0.1V at the utmost. In the bias control circuit 200 according to the embodiment of the present invention, the differential amplifier 63a effectively amplifies only the frequency components to a much larger output signal by subtracting the optical monitor components (first reference signal Vavg1a) from the monitor signal (first monitor signal) Vmon1. Namely, even if the differential amplifier 63a has a limitation such that magnitude of output voltage thereof is less than 2V, the differential amplifier (first amplifier) 63a amplifies a difference equal to the monitor signal Vmon1 minus the optical monitor components (reference voltage Vavg1a), Vmon1−Vavg1a, which corresponds to the frequency components (magnitude 0.05V) to the output voltage (magnitude 2V) by setting the gain to 40 times. Thus, the differential amplifier 63a amplifies only the frequency components (first frequency components) originating from the dither signal (first dither signal) included in the monitor signal (first monitor signal) Vmon1.

Referring back to FIG. 5, the controller 65 sets initial values of bias voltage (second bias voltages) Vbia1b that DAC 62c applies to respective electrodes of the outer modulator 54 (Step S08). Next, ADC 61b acquires a digital signal Dmon1b corresponding to a monitor signal (second monitor signal) Vmon2 through the filter 67 regarding the outer modulator 54 (Step S09). Then, the controller 65 calculates average of the digital signal Dmon1b as a digital signal Davg1b and updates the reference signal (second reference signal) Vavg1b that is output from an output terminal of DAC 62b according to the digital signal Davg1b (Step 10).

Further, the controller 65 inputs a digital signal to DAC 62c so that a dither signal is superposed to the bias voltage (second bias voltage) Vbia1b of the outer modulator 54 (target outer modulator) (Step 11). Then, ADC 61c samples the differential amplified signal (second amplified signal) Vdi1b that the differential amplifier 63b generates from the reference signal (second reference signal) Vavg1b and the monitor signal (second monitor signal) Vmon2 through the filter 67, and outputs a digital signal Ddi1b converted from the differential amplified signal Vdi1b by D/A conversion (Step 12). Then, the controller 65 calculates a difference of sampled values for the digital signal Ddi1b (the same data processing as performed for the inner modulator) and generates a digital signal Dbia1b for controlling the bias voltages (second bias signals) of the target outer modulator so that the difference approaches zero. The controller 65 updates setting values of DAC 62c based on the digital signal Dbia1b (Step 13). Thus, bias voltages applied to electrodes of a target outer modulator has been adjusted. Steps S09 to S13 may be repeated for all the outer modulators if the number thereof is more than one (Step 14). The procedures of bias voltage control are repeated in a predetermined period, which may be set longer than a period of the dither signal, for example, 1 ms.

According to the bias control circuit 200 built in the optical transmitter 1 described above, the differential amplifier 63a generates a differential amplified signal Vdu1a (first amplified signal) from a voltage difference between the monitor signal (first monitor signal) Vmon1 to monitor intensity of the optical signal output from the second QPSK modulator 5 and average of the monitor signal (first reference signal) Vavg1a. Thus, the differential amplifier 63a may effectively amplify only frequency components originating from amplitude modulation by a dither signal, without depending on intensity of the monitor signal. High gain for amplifying the dither components may improve sensitivity and accuracy for the bias voltage control. In addition, the controller 65 digitally extracts frequency components (first frequency components) Dext1a from the digital signal (first digital signal) Ddi1a acquired from the differential amplified signal (first amplified signal) Vdi1a by A/D conversion. Then, the controller 65 adjusts bias voltages (first bias signals) in according to intensity of the frequency components (first frequency components) and generates a digital signal Dbia1a to superpose a dither signal to the bias signals. DAC 62c converts the digital signal Dbia1a to a bias voltage Vbia1a by D/A conversion. The bias voltages Vbia1a (first bias signals) are applied to an inner modulator selected for the bias voltage control in the second QPSK modulator 5. Thus, the bias control circuit 200 may maintain the bias voltages provided for the inner modulators in respective optimum values thereof and stabilize the optical signal output from the second QPSK modulator 5. Further, the bias control circuit 200 may realize downsizing of circuit size and power saving by eliminating conventional large-size parts like an oscillator, a synchronous detector, low-pass filter, and so on. Conventional large-size circuits have used oscillators, synchronous detectors, low-pass filters, and so on. For example, a surface mounting area may be reduced by about 35% in comparison with a conventional bias control circuit implemented with such large-size analog parts.

In addition, the controller 65 in the bias control circuit 200 receives the monitor signal (first monitor signal) Vmon1 though ADC 61a and calculates average Davg1a from the digital monitor signal Dmon1 converted from the monitor signal Vmon1 by A/D conversion, and provides the average Davg1a to DAC 62c so that the reference signal (first reference signal) Vavg1a is input to the differential amplifier (first differential amplifier) 63a. In the configuration described above, downsizing of circuit size and power saving may be more improved by digital processing of the controller to calculate average of the monitor signal instead of using old low-pass filters. Also, by shortening detection time for monitoring intensity of the output signal, the bias control circuit may speed up response of the bias control.

The bias control circuit 200 further includes differential amplifier (second differential amplifier) 63b, ADC 61b, and DAC 62b. In such configuration, the differential amplifier 63b generates the differential amplified signal (second amplified signal) Vdi1b from a difference between the monitor signal Vmon1 whose low frequency components are cut by AC-coupling and average Vavg1b of the monitor signal Vmon1. The controller 65 generates a digital signal Dbia1b from the differential amplified signal Vdi1b and DAC 62c converts the digital signal Dbia1b to the bias voltage (second bias signals) Vbia1b by D/A conversion provided to the outer modulator 54. Thus, for the outer modulator 54 as well as the inner modulator 51, 52, the bias control circuit 200 may adjust the bias voltages to respective appropriate values thereof. Such configuration may bring about further downsizing of circuit size and power saving of the bias control circuit. Specifically, AC coupling by the filter 67a extracts the monitor signal (second monitor signal) Vmon2 from the monitor signal Vmon1. The monitor signal Vmon2 corresponds to high frequency components of the first monitor signal Vmon1. The AC coupling to separate the monitor signal Vmon2 from the monitor signal Vmon1 may prevent the monitor signal Vmon1 for the outer modulator 54 from interfering the control circuit for the inner modulators and deteriorating precise control of bias voltages (bias signals) for the inner modulators.

Figure 6:
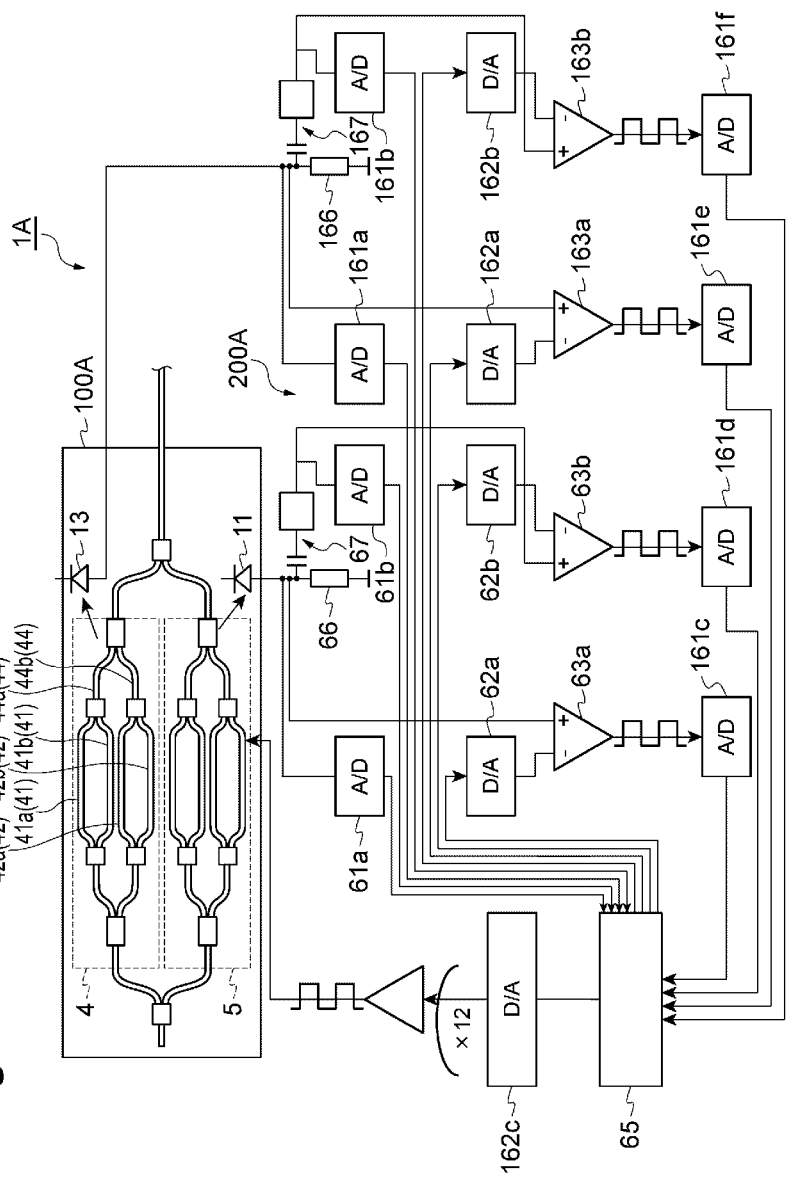
FIG. 6 is a schematic diagram of an optical transmitter according to a variation of the first embodiment of the present invention.

The multi-level phase modulators according to the embodiments of the present invention are not restricted for the DP-QPSK modulator (dual multi-level phase modulator for polarization multiplexing) 100 described above. For example, FIG. 6 is a schematic diagram of an optical transmitter 1A according to a variation of the first embodiment of the present invention. In the optical transmitter 1A, a second power monitor 13 is provided in the vicinity of the output terminal of the first QPSK modulator 4 so that the second power monitor 13 receives a portion of the optical signal branches out at the output terminal thereof. Then, in the bias control circuit 200A, the circuit configuration to control the bias voltages (bias signals) for the first QPSK modulator 4 is added to the circuit configuration to control the bias voltages for the second QPSK modulator. Specifically, the bias control circuit 200A includes an ADC 161a, a DAC 162a, and a differential amplifier 163a to precisely monitor the monitor signal Vmon1x for the inner modulators 41, 42 of the first QPSK modulator 4 and generated differential voltage signal Vdi2a according to a difference between the monitor signal Vmon1x and average Vavg2a thereof. The bias control circuit 200A further includes an ADC 161b, a DAC 162b, and a differential amplifier 163b to precisely monitor the monitor signal Vmon1x for the outer modulator 44 of the first QPSK modulator 4 and generate a differential voltage signal Vdi2b according to a difference between the monitor signal Vmon1x and average Vavg2b thereof. In addition, the bias control circuit 200a further includes a resistor 166 connected with the second power monitor 13 in series and a filter 167 to connected the output terminal of the second power monitor 13 with ADC 161b and the differential amplifier 163b by AC coupling. The resistor 166 converts the current signal output from the second power monitor 13 to a monitor signal Vmon1x, which corresponds to intensity of the optical signal output from the first QPSK modulator 4. In addition, the bias control circuit 200A further includes ADC 161c, 161d, 161e, and 161f to convert output signals thereof to respective digital signals by D/A conversion and DAC 162c in downstream of the controller 65. DAC 162c provides twelve bias voltages to eight electrodes of four inner modulators and four electrodes of two outer modulators in the first QPSK modulator 4 and the second QPSK modulator by D/A conversion.

The optical transmitter 1A according to the variation of the embodiment may provide the bias voltages maintained in respective appropriate values thereof for all inner modulators and all outer modulators included in the first QPSK modulator 4 and the second QPSK modulator, and thus stabilize respective optical signals (X modulated signal and Y modulated signal) output from the QPSK modulators. In addition, downsizing of circuit size and power saving may be realized.

Figure 7:
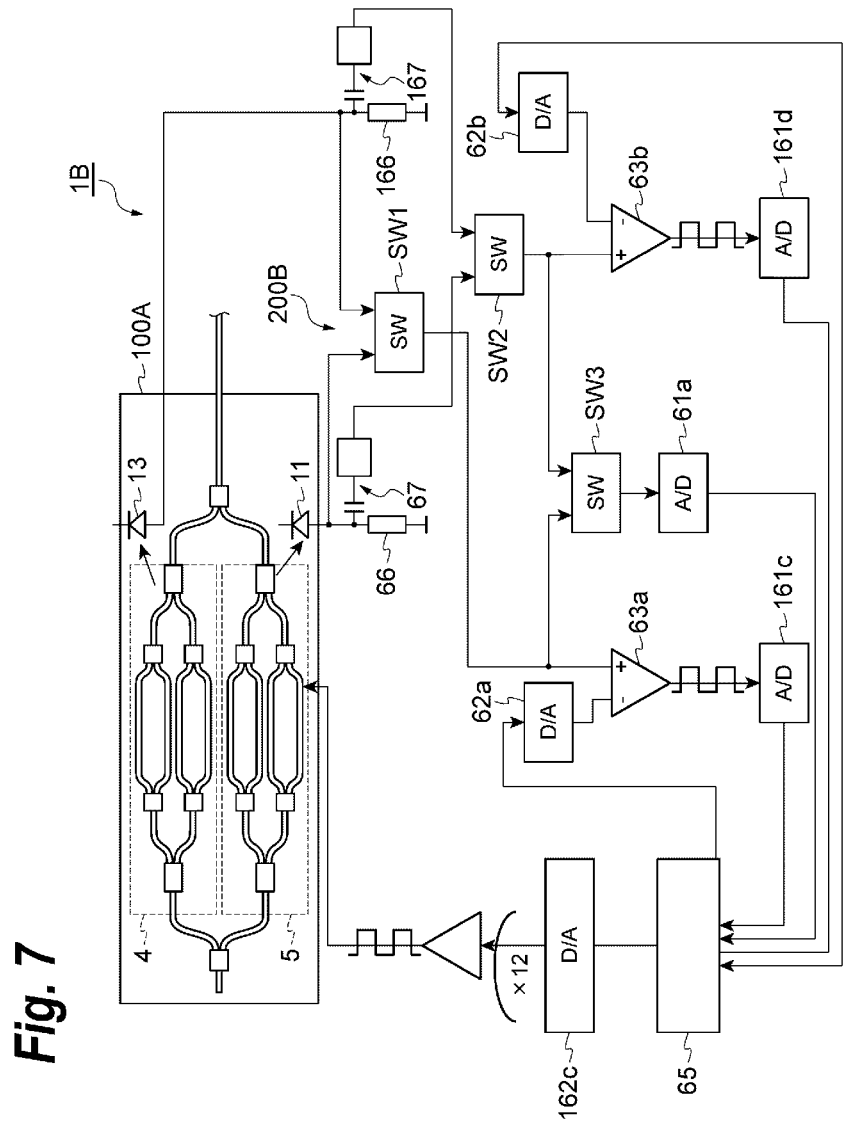
FIG. 7 is a schematic diagram of an optical transmitter according to another variation of the first embodiment of the present invention.

FIG. 7 is a schematic diagram of an optical transmitter 1B according to another variation of the first embodiment of the present invention. In the bias control circuit 200B in the optical transmitter 1B, some ADCs, DACs, and differential amplifiers are shared for the first QPSK modulator 4 and the second QPSK modulator 5. Procedures for the bias control may be processed for the first QPSK modulator 4 and the second QPSK modulator 5 in time sharing processing.

More specifically, the bias control circuit 200B further includes switches SW1, SW2, and SW3 and excludes ADCs 61b, 161a, 161b, DACs 162a, 162b, differential amplifiers 163a, 163b, and ADCs 161e, 161f from the bias control circuit 200A in FIG. 6. The switch SW1 selects one monitor signal from the monitor signal (first monitor signal) Vmon1 acquired from the first power monitor 11 and the monitor signal (another first monitor signal) Vmon1x acquired from the second power monitor 13 and outputs the selected monitor signal to the differential amplifier (first differential amplifier) 63a and the switch 3. The switch SW2 selects one monitor signal from the monitor signal (second monitor signal) Vmon2 acquired from the first monitor signal Vmon1 through an AC coupling and the monitor signal (another second monitor signal) Vmon2x acquired from the monitor signal Vmon2 through another AC coupling and outputs the selected monitor signal to the differential amplifier 63b and the switch SW3. The switch SW3 selects one monitor signal from the selected monitor signal output from the switch SW1 and the selected monitor signal output from the switch SW2 and outputs the selected one to ADC 61a. The controller 65 controls the bias voltages (first bias signals) for the inner modulators and the outer modulators in the first QPSK modulator 4 and the second QPSK modulator 5 in time sharing processing by sending selection signals to the respective switches SW1, SW2, and SW3.

For example, for adjusting the bias voltages (first bias signals) of the first QPSK modulator 4, first, the controller 65 sends selection signals to the switch SW1 and SW2, so that the switch SW1 selects the monitor signal Vmon1x acquired from the second power monitor 13 and the switch SW2 selects the monitor signal Vmon2x acquired through another AC coupling. Second, when the controller 65 adjusts the bias voltages (first bias signals) of the inner modulators 41, 42 in the first QPSK modulator 4, the switch SW3 selects the selected monitor signal output from the switch SW1 in a time slot of the time sharing processing. Third, when the controller 65 adjusts the bias voltages of the outer modulator 44 in the first QPSK modulator 4, the switch SW3 selects the selected monitor signal output from the switch SW2 in another time slot of the time sharing processing. Alternatively, for adjusting the bias voltages (bias signals) of the second QPSK modulator 5, first, the controller 65 sends selection signals to the switch SW1 and SW2, so that the switch SW1 selects the monitor signal Vmon1 acquired from the second power monitor 11 and the switch SW2 selects the monitor signal Vmon2 acquired through another AC coupling. Second, when the controller 65 adjusts the bias voltages (first bias signals) of the inner modulators 51, 52 in the second QPSK modulator 5, the switch SW3 selects the selected monitor signal output from the switch SW1 in a time slot of the time sharing processing. Third, when the controller 65 adjusts the bias voltages (second bias signals) of the outer modulator 54 for the second QPSK modulator 5, the switch SW3 selects the selected monitor signal output from the switch SW2 in another time slot of the time sharing processing. The switches SW1, SW2, and SW3 may be discrete or integrated in one package. The controller 65 sends selection signal to the respective switches SW1, SW2, and SW3 to switch the target inner modulator or the target outer modulator in the steps 07 to 14 in FIG. 5.

For example, when the controller 65 adjusts the bias voltages of the inner modulators 51, 52 of the second QPSK modulator 5, the switch SW1 is switched so as to select the first power monitor 11 and the switch SW3 is switched so as to select the switch SW1. Subsequently, when the controller 65 adjusts the bias voltages of the inner modulators 41, 42 of the first QPSK modulator 4, the switch SW1 is just switched so as to select the second power monitor 13. In another case, when the controller 65 adjusts the bias voltages of the outer modulators 54 of the second QPSK modulator 5, the switch SW2 is switched so as to select the first power monitor 11 and the switch SW3 is switched so as to select the switch SW2. Subsequently, when the controller 65 adjusts the bias voltages of the outer modulators 44 of the first QPSK modulator 4, the switch SW2 is just switched so as to select the second power monitor 13. The bias voltage adjustment is repeated for each of the inner modulators and the outer modulators. For the procedures in FIG. 7, the time sharing processing uses at least six time slots in total for the inner modulators 91, 42, 51, 52 and the outer modulators 44, 54. One time slot may be within a second, which is sufficiently shorter than time scale of the drift phenomenon, for example, from ten to dozens of second. In other words, the bias control by time sharing processing may sufficiently follow the relatively slow change of the drift phenomenon. In addition, the adjustment of bias voltages for an inner modulator or an outer modulator does not have to be completed within one time slot. For example, the controller 65 may store intermediate values of the bias voltages to a memory at the end of one time slot and afterwards resume the adjustment of the bias voltage with the intermediate values loaded from the memory in the other time slot. Therefore, the optimization of bias voltages may be completed by taking a plurality of time slots.

The optical transmitter 1B may maintain the bias voltages for the first and second QPSK modulators in respective optimum values in a smaller circuit size in comparison with the optical transmitter 1A. Accordingly, the optical transmitter 1B may realize further downsizing of circuit size and power saving.

Figure 8:
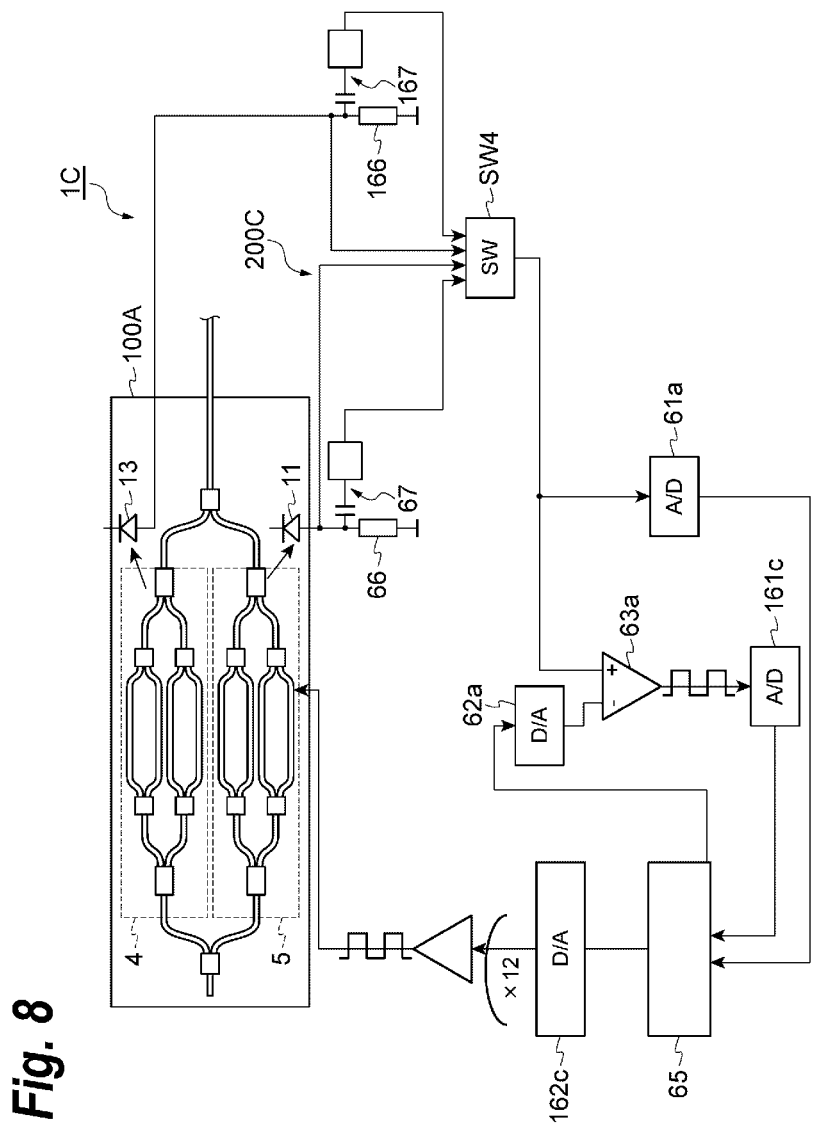
FIG. 8 is a schematic diagram of an optical transmitter according to further variation of the first embodiment of the present invention.

FIG. 8 is a schematic diagram of an optical transmitter 1C according to a further variation of the first embodiment of the present invention. The bias control circuit 200C in the optical transmitter 1C includes one unified circuit to adjust the bias voltages for all inners and outer modulators 41, 42, 51, 52, 44, and 54 in the first and second QPSK modulators 4, 5 in time sharing processing.

More specifically, the bias control circuit 200C in FIG. 8 further includes a switch 4 and excludes DAC 62b, the differential amplifier 63b, and ADC 161d from the bias control circuit 200B in FIG. 7. The switch SW4 selects one monitor signal from the monitor signal Vmon1 acquired from the first power monitor 11, the monitor signal Vmon2 acquired from the first monitor signal Vmon1 through an AC coupling (filter 67), the monitor signal Vmon1x acquired from the second power monitor 13, and the monitor signal Vmon2x acquired through an AC coupling (filter 167) and output the selected monitor signal to ADC 61a. The controller 65 controls respective bias voltages for the inner modulators 41, 42, and outer modulator 44 in the first QPSK modulator 4 and the inner modulators 51, 52, and outer modulator 54 in the QPSK modulator 5 in time sharing processing by sending one selection signal to the switch SW4. For example, when the bias control circuit 200C adjusts the bias voltages for an inner modulator, 41 or 42, of the first QPSK modulator 4, the switch SW4 is switched so as to select the second power monitor 13 and the monitor signal occurring at the one end of the resistor 166 according to a selection signal from the controller 65. Subsequently, when the bias control circuit 200C adjusts the bias voltages of the outer modulator 44 of the first QPSK modulator 4, the switch SW4 is switched to select the filter 167 according to the selection signal. In the similar way, the controller 65 may control bias voltages of the inner modulator 51, 52 and the outer modulator 54 of the second QPSK modulator 5 in time sharing processing. The time slot may be within a second and six time slots may constitute one routine of the time sharing processing for all inner and outer modulators 41, 42, 51, 52, 44, and 54 of the first and second QPSK modulators 4, 5.

The optical transmitter 1C may maintain the bias voltages for the first and second QPSK modulators in respective optimum values thereof in a further smaller circuit size in comparison with the optical transmitter 1B. Accordingly, the optical transmitter 1C may enhance downsizing of circuit size and power saving.

We claim:

1. A bias control circuit for multi-level phase modulator that includes an outer modulator and a first power monitor, the outer modulator including a pair of optical waveguides each providing inner modulators, each of the inner modulators including a pair of optical waveguides, the first power monitor receiving an optical signal output from the multi-level phase modulator, the bias control circuit comprising:
 a bias generator configured to provide first bias signals to the respective optical waveguides of one of the inner modulators, each of the first bias signals including first dither signals superposed thereon having predetermined frequencies equal to each other;
 a resistor connected in series to the first power monitor, the resistor converting a current signal output from the first power monitor to the first monitor signal;

a first differential amplifier configured to receive the first monitor signal and a first reference signal, the first differential amplifier generating a first amplified signal corresponding to a difference between the first monitor signal and the first reference signal;

a first analog-to-digital converter (ADC) that converts the first monitor signal to a first digital signal;

a first digital-to-analog converter (DAC); and a controller configured to detect first frequency components contained in the first amplified signal and originating to the first dither signals, and provide a first control signal according to intensity of the first frequency components to the bias generator, wherein the controller calculates an average of the first digital signal, wherein the first DAC converts the average of the first digital signal into the first reference signal that is provided to the first differential amplifier, and wherein the first bias signals provided to the first optical waveguides are adjusted according to the first control signal.

2. The bias control circuit of claim 1, further comprising:
a second ADC,
wherein the second ADC converts the first amplified signal to a second digital signal,
wherein the controller generates a digital dither signal having the predetermined frequency and detects the intensity of the first frequency components of the first amplified signal by comparing the digital dither signal with the second digital signal, and superposes the digital dither signal on the first control signal,
wherein the bias generator includes a second DAC that converts the first control signal to one of the first bias signals.

3. A bias control circuit: for multi-level phase modulator that includes an outer modulator and a first power monitor, the outer modulator including a pair of optical waveguides each providing inner modulators, each of the inner modulators including a pair of optical waveguides, the first power monitor receiving an optical signal output from the multi-level phase modulator, the bias control circuit comprising a bias generator configured to provide first bias signals to the respective optical waveguides of one of the inner modulators, each of the first bias signals including first dither signals superposed thereon having predetermined frequencies equal to each other;

a resistor connected in series to the first power monitor, the resistor converting a current signal output from the first power monitor to the first monitor signal;

a first differential amplifier configured to receive the first monitor signal and a first reference signal, the first differential amplifier generating a first amplified signal corresponding to a difference between the first monitor signal and the first reference signal;

a filter including a capacitor and a log amplifier, the capacitor having one end coupled with the first power monitor and another end coupled with the log amplifier, the log amplifier generating a second monitor signal from the first monitor signal received through the capacitor;

a second differential amplifier configured to receive the second monitor signal and a second reference signal, the second differential amplifier outputting a second amplified signal corresponding to a difference between the second monitor signal and the second reference signal to the controller; and a controller configured to detect first frequency components contained in the first amplified signal and originating to the first dither signals, and generate a first control signal according to intensity of the first frequency components to the bias generator, wherein the first bias signals provided to the first optical waveguides are adjusted according to the first control signal;

wherein the bias generator provides second bias signals to the respective second optical waveguides, each of the second bias signals including second dither signals superposed thereon, the second dither signals having the predetermined frequency; and wherein the controller detects second frequency components contained in the second amplified signal and generates a second control signal corresponding to intensity of the second frequency components, the second bias signals being adjusted according to the second control signal.

4. A bias control circuit for multi-level phase modulator including an outer modulator and a first power monitor, the outer modulator including a pair of optical waveguides each providing inner modulators, each of the inner modulators including a pair of optical waveguides, the first power monitor receiving an optical signal output from the multi-level phase modulator, the bias control circuit comprising:

a bias generator configured to provide first bias signals to the respective first optical waveguides of one of the first modulator, and second bias signals to the respective second optical waveguides, each of the first bias signals including first dither signals superposed thereon, each of the second bias signals including second dither signals superposed thereon; a resistor connected in series to the first power monitor, the resistor converting a current signal output from the first power monitor to a first monitor signal;

a filter including an input terminal, an output terminal, and a capacitor, the input terminal being coupled with the output terminal through the capacitor, the input terminal receiving the first monitor signal, the output terminal generating a second monitor signal;

a switch configured to receive the first monitor signal and the second monitor signal, the switch outputting one of the first monitor signal and second monitor signal as a selected monitor signal;

a first differential amplifier configured to receive the selected monitor signal from the switch and a first reference signal, the first differential amplifier generating an first amplified signal corresponding to a difference between the selected monitor signal and the first reference signal; and a controller configured to operate a time sharing process by iterating time slots;

wherein, in one of the time slots, the controller sends a selection signal to the switch for selecting the first monitor signal, detects a first frequency components contained in the first amplified signal and originating from the first dither signals, and generates a first control signal according to intensity of the first frequency components, and, in another of the time slots, the controller sends the selection signal to the switch for selecting the second monitor signal, detects a second frequency components contained in the first amplified signal and originating from the second dither signals, and generates a second control signal according to intensity of the second frequency components.

5. An optical transmitter comprising:
a multi-level phase modulator including:
- an outer modulator including a pair of optical waveguides each providing inner modulators, each inner modulators including a pair of waveguides, and a power monitor configured to receive an optical signal output from the multi-level phase modulator and generate a current signal according to intensity of the optical signal; and a bias control circuit including:
- a bias generator configured to provide bias signals to the respective waveguides of one of the inner modulator and adjust the respective bias signals, each of the first bias signals including first dither signals superposed thereon having respective predetermined frequencies,
- a resistor connected in series with the power monitor, the resistor converting a current signal output from the power monitor to a monitor signal,
- a differential amplifier configured to receive the monitor signal and a reference signal, the differential amplifier generating an amplified signal corresponding to a difference between the monitor signal and the reference signal,
- an analog-to-digital converter (ADC) that converts the monitor signal into a digital signal,
- a digital-to-analog converter (DAC), and
- a controller configured to detect frequency components contained in the amplified signal and originating from the dither signals, and generate a control signal according to intensity of the frequency components, the control signal adjusting the bias signals wherein the controller calculates an average of the digital signal, and wherein the DAC converts the average of the digital signal to the reference signal.

* * * * *